US008354919B2

(12) United States Patent
Gallarzo

(10) Patent No.: US 8,354,919 B2
(45) Date of Patent: Jan. 15, 2013

(54) SYSTEM AND METHOD FOR ACTIVATING AND DEACTIVATING A REMOTELY CONTROLLED VEHICLE STARTER

(76) Inventor: Jose L. Gallarzo, Chicago, IL (US)

( * ) Notice: Subject to any disclaimer, the term of this patent is extended or adjusted under 35 U.S.C. 154(b) by 1037 days.

(21) Appl. No.: 12/354,154

(22) Filed: Jan. 15, 2009

(65) Prior Publication Data

US 2009/0178639 A1 Jul. 16, 2009

Related U.S. Application Data

(60) Provisional application No. 61/021,526, filed on Jan. 16, 2008.

(51) Int. Cl.
*F02N 11/08* (2006.01)
*G06F 17/00* (2006.01)

(52) U.S. Cl. ............. 340/12.22; 340/426.13; 340/426.2; 340/426.21; 340/7.1; 340/5.64; 307/10.1; 307/10.5; 123/179.2

(58) Field of Classification Search ........................ None
See application file for complete search history.

(56) References Cited

U.S. PATENT DOCUMENTS 2,860,214 A * 11/1958 Bourns et al. ................. 338/117
5,000,139 A 3/1991 Wong
5,054,569 A 10/1991 Scott et al.
5,113,427 A * 5/1992 Ryoichi et al. ................. 340/7.1
5,129,376 A * 7/1992 Parmley ..................... 123/179.2
5,225,713 A * 7/1993 Henneberry et al. ......... 307/10.2
5,432,495 A * 7/1995 Tompkins ..................... 340/429
5,721,550 A * 2/1998 Lopez ........................... 341/176
5,917,405 A 6/1999 Joao
6,559,558 B2 5/2003 Quesnel et al.
6,893,298 B2 * 5/2005 Scarpellini et al. ........... 439/701
2005/0030156 A1 2/2005 Alfonso et al.
2011/0244846 A1 * 10/2011 Min .............................. 455/420
2012/0028680 A1 * 2/2012 Breed ......................... 455/556.1

FOREIGN PATENT DOCUMENTS

CA 2366634 A1 * 7/2002

* cited by examiner

*Primary Examiner* — Benjamin C Lee
*Assistant Examiner* — Rajsheed Black-Childress
(74) *Attorney, Agent, or Firm* — James Ray & Assoc

(57) ABSTRACT

A system for activating and deactivating a remotely controlled vehicle starter includes a handheld mobile communication device having at least a speaker mounted therein and a wireless transmitter having at least a start switch mounted therein. A first wire connects a negative voltage supply path to the speaker circuit with a negative voltage supply path to the start switch circuit. A variable resistor is provided and has a pair of end terminals. There is a second wire having each of a first end thereof electrically connected to a positive voltage supply path to the speaker circuit and an opposed second end thereof electrically connected to one terminal end of the variable resistor. A third wire is also provided to connect an opposed end terminal of the variable resistor to a positive voltage supply path to the start switch.

14 Claims, 3 Drawing Sheets

SYSTEM AND METHOD FOR ACTIVATING AND DEACTIVATING A REMOTELY CONTROLLED VEHICLE STARTER

CROSS-REFERENCE TO RELATED APPLICATIONS

This application is related to and claims priority from Provisional Patent Application Ser. No. 61/021,526 filed on Jan. 16, 2008.

FIELD OF THE INVENTION

The present invention relates, in general, to remotely controlled vehicle starters and, more particularly, this invention relates to an apparatus for remotely controlling a remote vehicle starter installed on the vehicle by way of a handheld mobile communication device and a handheld transmitter.

BACKGROUND OF THE INVENTION

As is generally well known, conditional remote starters for vehicles may only be activated from a relatively close distance to such vehicle. Thus, some users of vehicles equipped with remote starters find themselves exposed to greater than desirable effects of heat or cold when they arrive at their vehicles. People may have to wait for their vehicle to warm up because the traditional receiver does not allow them to start the automobile from far away. This could cost them precious time. Because they still have to wait for the car to heat up or cool off, users could regret spending a large amount of money on such an item. One may also struggle trying to locate their remote receiver in their purse, pocket or briefcase because they are usually small in size.

Prior to the conception and development of the present invention, efforts have been made to increase the distance from which the remote starter can be activated.

U.S. Publication No. 2005/0030156 published to Alfonso et al. discloses a long-range wireless vehicle command system that can be used to provide commands to a conventional remote vehicle starter over long distances. The long-range wireless vehicle command system may be based on existing wireless technology such as a pager and the transmitter of a remote vehicle starter.

U.S. Pat. No. 6,559,558 issued to Quesnel et al. discloses a complex arrangement of using a telephonically-originated message to activate a servomotor in order to manipulate pins positioned above a start button of a handheld remote transmitter so as to depress the start button and emit an activating command signal to the remote starter.

U.S. Pat. No. 5,054,569 issued to Scott et al. provides a system for use in remotely starting a motor vehicle and operating vehicle accessories that includes a remote unit having a digital controller providing encoded digital command signals and a vehicle unit which receives the digital command signals and controllably operates the vehicle's engine and accessories in dependence thereon. The system is characterized by a frequency shift keying method of signal transmission.

U.S. Pat. No. 5,000,139 issued to Wong teaches an automobile engine starter that includes a controller for monitoring the internal temperature of the vehicle and generating a temperature signal when that temperature falls outside a predetermined range. The vehicle is also equipped with a mobile telephone or radio receiver that may receive a signal from a remote location to generate a remote starting signal that may be combined with the temperature signal to start the engine when both signals are present.

U.S. Pat. No. 5,917,405 issued to Joao discloses a control apparatus for a vehicle, which comprises a first control device. The first control device generates and/or transmits a first signal for one of activating, deactivating, enabling, and disabling, one of a vehicle component, a vehicle device, a vehicle system, and a vehicle subsystem. The first control device is located at the vehicle. The first control device is responsive to a second signal, wherein the second signal is one of generated by and transmitted from a second control device. The second control device is located at a location which is remote from the vehicle. The second control device is responsive to a third signal, wherein the third signal is one of generated by and transmitted from a third control device. The third control device is located at a location which is both remote from the vehicle and remote from the second control device.

While the above prior art devices and systems are capable of increasing the distance from which the remote starter of the vehicle can be activated, there is a continuing need for an improved and less complex system for remotely starting a vehicle having a remote starter thereon.

SUMMARY OF THE INVENTION

In a first aspect, the present invention provides a system for at least one of activating and deactivating a remotely controlled starter on a vehicle. The system includes a wireless communication device positioned within confines of the vehicle for receiving a first command signal and for transmitting a second command signal. The wireless communication device has at least a sound emitting speaker mounted therewithin. A wireless transmitter is also positioned within the confines of the vehicle for transmitting a third command signal in response to receipt of the second command signal. The third command signal causes activation or deactivation of the remotely controlled starter. There is means for electrically connecting a speaker circuit of the wireless communication device to a start switch circuit disposed within the wireless transmitter.

In accordance with another aspect, the invention provides a system for at least one of activating and deactivating a remotely controlled starter on a vehicle. The system includes a handheld mobile communication device having at least a speaker mounted therein. A wireless transmitter is also provided and has at least a start switch mounted therein. The start switch is associated with the remotely controlled starter. A first wire has each of a first end thereof electrically connected to a negative voltage supply path to the speaker circuit and a second end thereof electrically connected to a negative voltage supply path to the start switch circuit. There is a variable resistor that has a pair of end terminals. A second wire is provided and has each of a first end thereof electrically connected to a positive voltage supply path to the speaker circuit and an opposed second end thereof electrically connected to one terminal end of the variable resistor. A third wire is also provided and has each of a first end thereof electrically connected to an opposed end terminal of the variable resistor and an opposed second end thereof electrically connected to a positive voltage supply path to the start switch circuit.

In accordance with yet another aspect, the present invention provides a method for at least one of activating and deactivating a remotely controlled vehicle starter by a combination of a handheld mobile communication device and a handheld transmitter. The method includes the steps of coupling a negative voltage supply path to a speaker circuit of the handheld mobile communication device to a negative voltage supply path to a start switch circuit of the handheld transmitter. Then, coupling one end terminal of a variable resistor to a positive voltage supply path to the speaker circuit. Next, coupling an opposed end terminal of a variable resistor to a positive voltage supply path to the start switch circuit. Adjusting the variable resistor to supply a predetermined voltage to the start switch circuit. Then, positioning each of the handheld mobile communication device, the variable resister and the handheld transmitter, coupled therebetween, within confines of the vehicle. Next, generating, at a remote location, a first command signal. Then, receiving, at the handheld mobile communication device, such first command signal. Transmitting, with the handheld mobile communication device, a second command signal. Next, receiving, at the handheld transmitter, the second command signal. Finally, transmitting, with the handheld transmitter, a third command signal.

OBJECTS OF THE INVENTION

It is, therefore, one of the primary objects of the present invention to provide a system for remotely controlling a remote vehicle starter.

Another object of the present invention is to provide a system for remotely controlling a remote vehicle starter that employs a handheld mobile communication device, such as a cell phone, coupled to handheld transmitter provided with such remote starter.

Yet another object of the present invention is to provide a system for remotely controlling a remote vehicle starter that can be easily installed on vehicles presently in use.

A further object of the present invention is to provide a system for remotely controlling a remote vehicle starter that prevents unauthorized starting of such vehicle.

Yet a further object of the present invention is to provide a system for remotely controlling a remote vehicle starter that is simple and economical to manufacture.

An additional object of the present invention is to provide a system for remotely controlling a remote vehicle starter that can provide audible confirmation of started vehicle.

Another object of the present invention is to provide a method for at least one of activating and deactivating a remotely controlled vehicle starter by employing the above described system.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
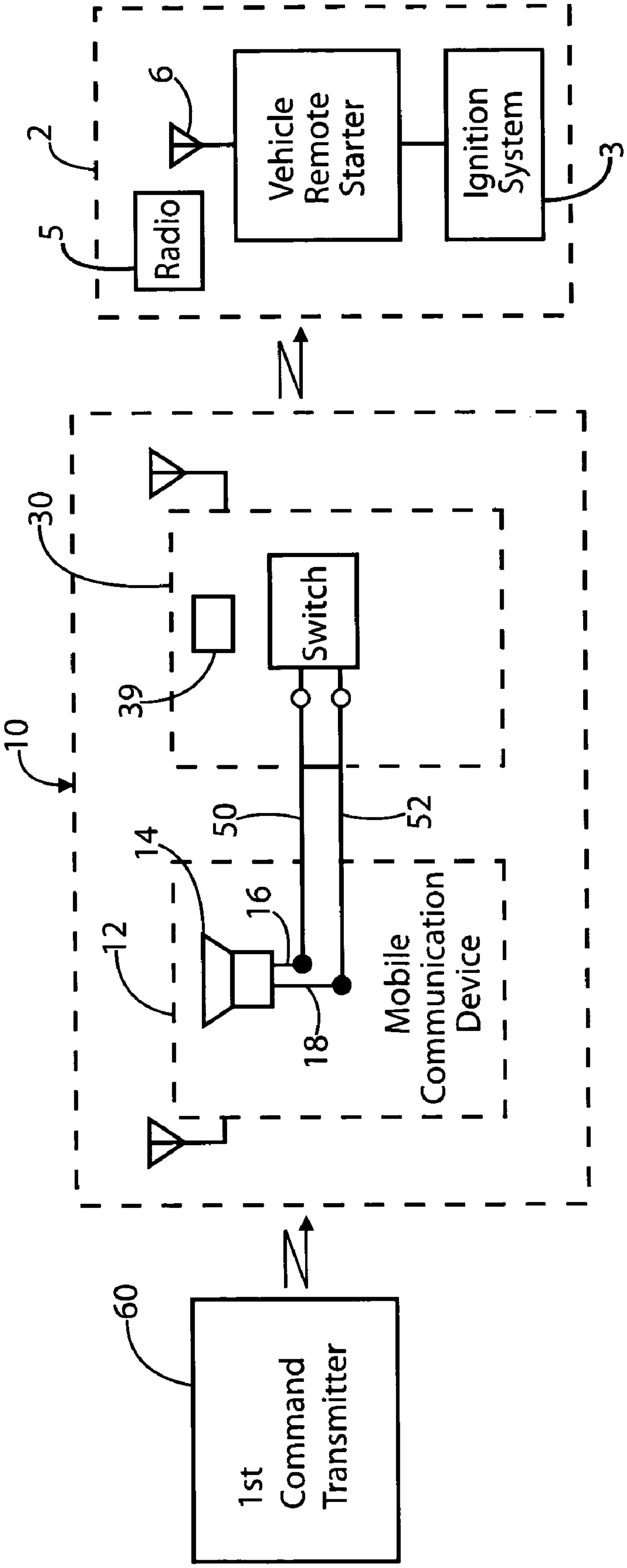
FIG. 1 is a block diagram of a system for activating and deactivating a remotely controlled starter installed on a vehicle constructed in accordance with one embodiment of the invention.

Prior to proceeding to the more detailed description of the present invention, it should be noted that, for the sake of clarity and understanding, identical components which have identical functions have been identified with identical reference numerals throughout the several views illustrated in the drawing figures.

Figure 2:
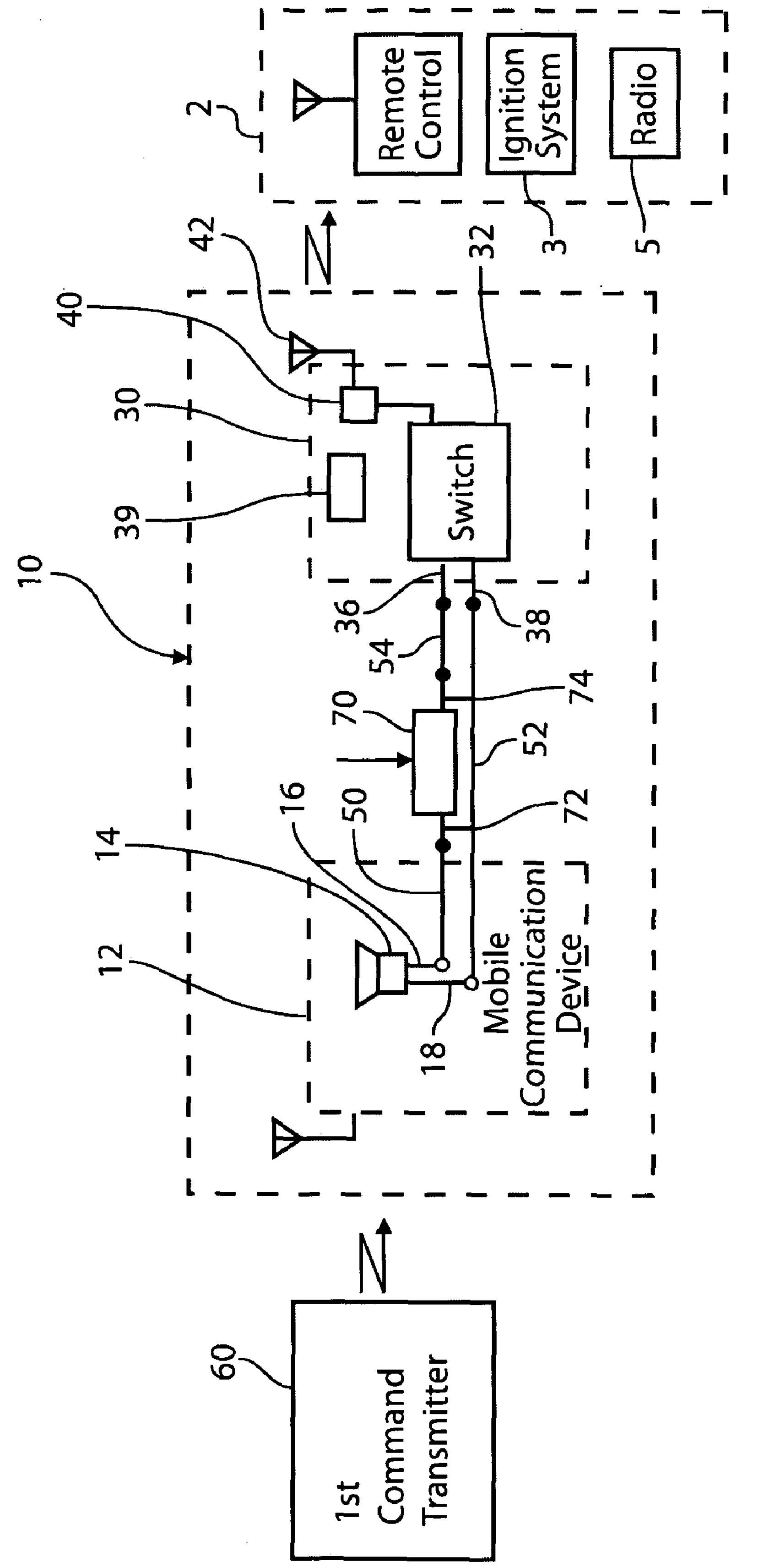
FIG. 2 is a block diagram of a system for activating and deactivating a remotely controlled starter installed on a vehicle constructed in accordance with the presently preferred embodiment of the invention embodiment.
Figure 3:
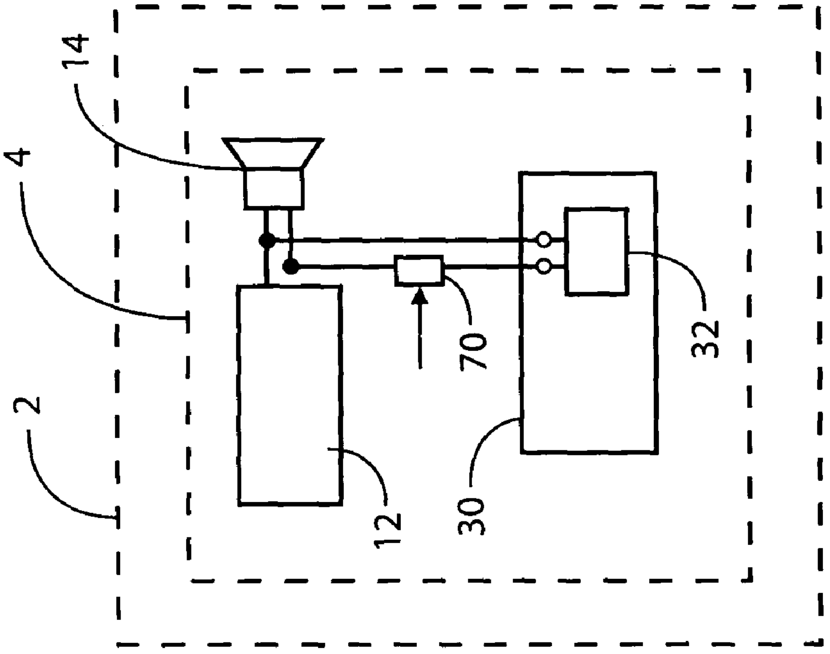
FIG. 3 is a block diagram of a system for activating and deactivating a remotely controlled starter installed on a vehicle constructed in accordance with another embodiment of the invention.

The best mode for carrying out the invention is presented in terms of its presently preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The present invention provides a system, generally designated as 10, for remotely activating and deactivating a remotely controlled starter 4 installed on a vehicle 2 and generally coupled to an ignition system 3 thereof. The remote starter 4 can be of any conventional type and has an antenna 6 capable of receiving wireless transmissions. The essential elements of the system 10 of the present invention include a handheld mobile communication device 12 and a wireless handheld transmitter 30 capable of activating and deactivating the remotely controlled starter 4.

Reference is now made, to FIG. 1 that illustrates a block diagram of the system 10 constructed in accordance with one embodiment of the invention. The handheld mobile communication device 12 is positioned within confines of the vehicle 2 for receiving a first command signal and for transmitting a second command signal. Preferably, such handheld mobile communication device 12 is a conventional cell phone. While such conventional cell phone has many structural elements, the present invention is particularly concerned with a power or voltage supply connection to a speaker circuit 14. For the sake of brevity, such voltage supply connection is depicted by a positive voltage path 16 and a voltage path 18.

Figure 4:
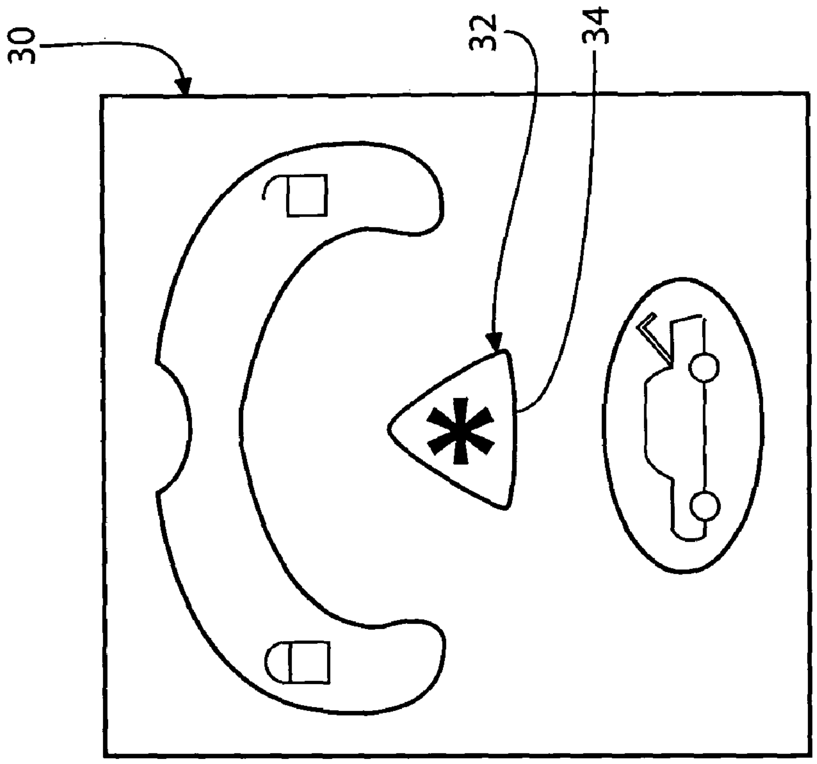
FIG. 4 is a planar view of a wirelesses transmitter employed in the system of FIGS. 1-2.

The wireless handheld transmitter 30 is generally supplied with the remotely controlled starter 4. While such wireless transmitter 30 is capable of performing various functions, the present invention is mostly concerned with a start switch 32, which is generally labeled with an "*" on linearly moveable button portion 34 thereof, best illustrated in FIG. 4. Such start switch 32 has one contact connected to a positive voltage path 36 and has another contact connected to negative voltage path 38. In operation, when the button portion 34 is depressed, the contacts of the switch 32 close energizing the transmitting circuit 40 of the remote transmitter 30 which then transmits a command signal to the remote starter 4 by way of the antenna 42.

To construct the system 10 of the present invention, the positive voltage path 16 of the speaker circuit 14 is electrically connected with a wire 50 to the positive voltage supply path 36 to the start switch 32 and the negative voltage supply path 18 is electrically connected with a second wire 52 to the negative voltage supply path 38 to the start switch circuit 32. Now, in operation, when the mobile communication device 12 receives a first command signal from a first command transmitter 60 positioned in a remote location, the voltage on the voltage supply paths 16 and 18 to the speaker circuit 14 increases resulting in audible sound emitted from the speaker circuit 14.

It would be understood by those skilled in the relevant art that the first command transmitter 60 is capable of dialing a unique phone number of such handheld mobile communication device 12. The first command transmitter 60 may be any one of another mobile communication device, a land line connected phone unit, computer equipped with voice over Internet Protocol (VoIP) capabilities and the like device.

At the generally same time, such voltage is placed onto positive and negative voltage paths 36 and 38 respectively of the start switch 32, essentially simulating activation thereof, enabling the transmitting circuit 40 and the antenna 42 to transmit the third command signal to the remotely controlled starter 4, causing activation thereof and, more particularly, causing vehicle 2 to start.

In operation, the mobile communication device 12 is set to a vibrate mode and is also set to auto answer mode after a predetermined number rings. The number of rings is predetermined to be equal to the number of actuations of the start switch 32 set by the manufacturer of the remotely controlled starter 4. The auto answer mode is critical to disable the ringing of the mobile communication device 12 after this predetermined number of rings so as to maintain proper operation of the remote transmitter 30. As it is well known, if the start switch 32 is continued to be activated by pressing the button portion 34, the operation of the remotely controlled starter 4 will be disabled causing the started vehicle 2 to turn off. Thus, the user of the system 10 can activate the remotely control starter 4 from longer distances than conventionally afforded by the remote transmitter 30, for example leaving from an office building or retail establishment, and benefit from improved climatic condition within the interior confines of the vehicle 2 upon approaching the vehicle 2.

It has been also found that setting mobile communication device 10 in auto answer mode allows the user to obtain confirmation of the started status of the vehicle 2 in audio format. For example, the user may leave the radio 5 of the vehicle 2 turned "ON" at all times. Thus, when the vehicle 2 is started, the radio 3 will begin to broadcast and such broadcast will be heard by the user of the system 10 calling the handheld mobile communication device 12.

It has been also found advantageous to prevent unauthorized operation of the system 10 by programming, within the handheld mobile communication device 12, a preselected phone number or numbers of the first command transmitter 60 authorized to activate the speaker circuit 14 while allowing other phone numbers to only operate the handheld mobile communication device 12 in the vibrate mode.

It will be also appreciated that since the remote transmitter 30 is also capable to deactivate already activated remotely controlled starter 4 by further using the start switch circuit 32, the system 10 is than capable of also deactivating such activated remotely controlled starter 4 and disabling operation of the vehicle 2 if the user generates another first command at the first command transmitter 60.

It has been also found that in some applications direct connection of the handled mobile communication device 12 to the handheld transmitter 30 causes transmission of the second and third command signals even when the first command signal is not received at such handled mobile communication device 12 due to presence of voltage in the speaker circuit 14.

Thus, in the presently preferred embodiment of the invention, shown in FIG. 2, a resistor 70 is coupled intermediate the handled mobile communication device 12 and the wireless handheld transmitter 30. The purpose for this resistor 70 is to reduce voltage supply from the speaker circuit 14 prior to receipt of the first command signal so as to eliminate unintended operation of the remotely controlled starter 4 while passing sufficient voltage to the wireless handheld transmitter 30 when the first command signal is received at the handled mobile communication device 12.

Preferably, the resistor 70 is of a variable resistor type, such as a potentiometer, so as to enable use of the system 10 with a wide variety of remotely operated controllers 4, mobile communication devices 12 and wireless handheld transmitters 30.

To integrate variable resistor 70 into the system 10, the wire 50 is adapted to electrically connect one end terminal 72 of the variable resistor 70 to the positive voltage supply path 16 to the speaker 14 and a third wire 54 used to electrically connect the opposed second end terminal 74 of the variable resistor 70 to the positive voltage supply path 36 to the start switch circuit 32.

In operation, the resistance of the variable resistor 70 is set to eliminate unintended activation of the handheld transmitter 30. On some handheld transmitters 30 having an indicator 39 which illuminates when the start switch 32 is activated, the variable resistor 70 can be easily adjusted by observing status of such indicator 39 and discontinuing adjustment effort when the indicator 39 is either illuminates or ceases to illuminate depending on the original setting of the variable resistor 70. It will be understood that when the variable resistor 70 is at its minimum resistance setting prior to the adjustment effort, the indicator 39 will illuminate.

The above described system 10, incorporating the variable resistor 70, was installed on a 2002 GMC Denali using an aftermarket remote starter manufactured Directed Electronics of Vista, Calif. under Avital brand, FCC ID No. EZSDE1474S and successfully tested from a distance of about 1,800 miles.

The system 10 can be disposed or mounted anywhere on the vehicle 2, even being placed into the glove box compartment (not shown) or simply being left on the seat.

Thus, the above described system 10 of the present invention enables activation and deactivation of the remote vehicle starter 4 from long distances and can be simply and cost effectively installed as an aftermarket system on vehicles 2 presently in use.

Another advantage of interconnecting the system 10 in above described manner is that other functionalities of the remote controlled starter 4, including security alarm interface, are enabled in a normal manner.

It is also within the scope of the present invention to integrate the relevant features of the handheld mobile communication device 12 and the handheld transmitter 30 as well as the resistor 70 either of a fixed or variable type directly into the remotely controlled starter 4.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. In combination with a vehicle having a remotely controlled starter, a system for at least one of activating and deactivating said remotely controlled starter, said system comprising:

(a) a wireless communication device positioned within confines of said vehicle for receiving a first command signal, said wireless communication device having at least a sound emitting speaker circuit mounted therewithin and being activated responsive to receipt of said first command signal to provide a second command signal;

(b) a wireless transmitter positioned within said confines of said vehicle for transmitting a third command signal in response to receipt of said second command signal, said third command signal causing at least one of activation and deactivation of said remotely controlled starter; and (c) means for electrically connecting said speaker circuit of said wireless communication device to a start switch circuit disposed within said wireless transmitter to trigger transmitting said third command signal, such that upon receipt of said first command signal, the wireless communication device activates said speaker circuit by a voltage signal, whereby said activating voltage signal constitutes said second command signal to said start switch circuit.

2. The system, according to claim 1, wherein said means for electrically connecting said wireless communication device to said wireless transmitter includes:

(a) a resistor having a pair of end terminals;

(b) a first wire having each of a first end thereof electrically connected to a negative voltage supply path of said speaker circuit and a second end thereof electrically connected to a negative voltage supply path to said start switch circuit;

(c) a second wire having each of a first end thereof electrically connected to a positive voltage supply path to said speaker circuit and an opposed second end thereof electrically connected to one end terminal of said resistor; and (d) a third wire having each of a first end thereof electrically connected to an opposed end terminal of said resistor and an opposed second end thereof electrically connected to a positive voltage supply path to said start switch circuit.

3. The system, according to claim 2, wherein said resistor is a variable resistor.

4. The system, according to claim 1, wherein said means for electrically connecting said wireless communication device to said wireless transmitter includes a pair of wires, one of said pair of wires connecting a negative voltage supply path of said speaker circuit to a negative voltage supply path of said start switch circuit and an opposed one of said pair of wires connecting a positive voltage supply path of said speaker circuit to a positive voltage supply path of said start switch circuit.

5. The system, according to claim 1, wherein each of said wireless communication device and said wireless transmitter is mounted within said remotely controlled starter.

6. The system, according to claim 1, wherein said wireless communication device is a handheld mobile communication device.

7. The system, according to claim 6, wherein said handheld mobile communication device is disposed within a passenger compartment of said vehicle.

8. In combination with a vehicle having a remotely controlled starter, a system for at least one of activating and deactivating said remotely controlled starter, said system comprising:

(a) a handheld mobile communication device for receiving a first wireless command signal and having at least a speaker mounted therein being activated by a voltage signal responsive to receipt of said first command signal to provide a second command signal (b) a wireless transmitter having at least a start switch mounted therein, said start switch triggers a wireless transmission of a third command signal responsive to said second command signal to the associated remotely controlled starter;

(c) a first wire having each of a first end thereof electrically connected to a negative voltage supply path to said speaker and a second end thereof electrically connected to a negative voltage supply path to said start switch circuit;

(d) a variable resistor having a pair of end terminals;

(e) a second wire having each of a first end thereof electrically connected to a positive voltage supply path to said speaker circuit and an opposed second end thereof electrically connected to one terminal end of said variable resistor; and (f) a third wire having each of a first end thereof electrically connected to an opposed end terminal of said variable resistor and an opposed second end thereof electrically connected to a positive voltage supply path to said start switch, wherein said first, second, and third wires and said variable resistor provide an electrical connection of said voltage signal constituting said second command signal to said start switch.

9. A method for at least one of activating and deactivating a remotely controlled vehicle starter by a combination of a handheld mobile communication device and a handheld transmitter, said method comprising the steps of:

(a) coupling a negative voltage supply path to a speaker circuit of said handheld mobile communication device to a negative voltage supply path to a start switch circuit of said handheld transmitter;

(b) coupling one end terminal of a variable resistor to a positive voltage supply path to said speaker circuit;

(c) coupling an opposed end terminal of a variable resistor to a positive voltage supply path to said start switch circuit;

(d) adjusting said variable resistor to supply a predetermined voltage to said start switch circuit;

(e) positioning each of said handheld mobile communication device, said variable resister and said handheld transmitter, coupled therebetween in steps (a) through (c) within confines of said vehicle;

(f) generating, at a remote location, a first command signal;

(g) receiving, at said handheld mobile communication device, said first command signal to activate said speaker circuit by a voltage signal;

(h) providing, with said handheld mobile communication device, a second command signal using said voltage signal through said couplings to said start switch circuit;

(i) receiving, at said handheld transmitter, said second command signal, provided in step (h); and (j) responsive thereto transmitting, with said handheld transmitter, a third command signal to said vehicle starter.

10. The method, according to claim 9, wherein said method includes the additional step of selecting a number of rings of said handheld mobile communication device after receipt of said first command signal in step (g) to equal a number of activations of said start switch circuit required to activate said vehicle remotely controlled starter.

11. The method, according to claim 9, wherein said step of receiving said first command signal includes the step of programming, within said handheld mobile communication device, at least one phone number preauthorized to generate transmission of said second command signal.

12. The method, according to claim 9, wherein said method includes the additional steps of verifying, within said handheld mobile communication device, that said received first command signal is a preauthorized first command signal.

13. The method, according to claim 12, wherein said method includes the additional steps of programming said handheld mobile communication device to operate in a vibrate mode when said received first command signal is not a preauthorized first command signal.

14. The method, according to claim 9, wherein said method includes the additional step of confirming, with said handheld mobile communication device, starting status of said vehicle.

* * * * *